(12) United States Patent
Sandberg et al.

(10) Patent No.: US 9,743,416 B2
(45) Date of Patent: Aug. 22, 2017

(54) METHOD AND NETWORK NODE FOR IMPROVING RESOURCE UTILIZATION OF A RADIO CELL

(71) Applicant: TELEFONAKTIEBOLAGET L M ERICSSON (PUBL), Stockholm (SE)

(72) Inventors: Sara Sandberg, Luleå (SE); Ame Simonsson, Gammelstad (SE); Magnus Thurfjell, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 340 days.

(21) Appl. No.: 14/428,128

(22) PCT Filed: Sep. 20, 2012

(86) PCT No.: PCT/EP2012/068535
§ 371 (c)(1),
(2) Date: Mar. 13, 2015

(87) PCT Pub. No.: WO2014/044310
PCT Pub. Date: Mar. 27, 2014

(65) Prior Publication Data
US 2015/0237634 A1    Aug. 20, 2015

(51) Int. Cl.
*H04W 72/04* (2009.01)
*H04W 36/22* (2009.01)
(Continued)

(52) U.S. Cl.
CPC ....... *H04W 72/0486* (2013.01); *H04W 36/22* (2013.01); *H04W 72/1273* (2013.01); *H04W 84/045* (2013.01)

(58) Field of Classification Search
None
See application file for complete search history.

(56) References Cited

U.S. PATENT DOCUMENTS

| 8,213,335 B2* | 7/2012 | Kwon | H04W 72/048 370/236.1 |
| 2002/0115464 A1* | 8/2002 | Hwang | H04W 52/54 455/522 |

(Continued)

FOREIGN PATENT DOCUMENTS

| EP | 2296394 A1 | 3/2011 |
| EP | 2429249 A1 | 3/2012 |
| WO | 2011011793 A2 | 1/2011 |

*Primary Examiner* — Jenee Williams
(74) *Attorney, Agent, or Firm* — Rothwell, Figg, Ernst & Manbeck, PC

(57) ABSTRACT

The present invention relates to a method of a network node for improving utilization of resources of a cell 102 provided by a radio base station (RBS), the cell covering a geographical area and being a cell served by a low power node (LPN) 101 of the RBS in a heterogeneous network 100. The method comprises determining a load of downlink (DL) resources of the cell used for wireless communication terminal(s) 104 connected to the cell. The method also comprises deciding, based on said determined load, that the DL bandwidth of the cell available for scheduling should be adjusted, allowing the power of the LPN to be reallocated for the adjusted bandwidth available for scheduling whereby a transition zone area 103 between the LPN and at least one neighboring node 105 will be adjusted accordingly. The transition zone is an area in which a path-loss is lower to the LPN than to the at least one neighboring node but a received DL power density is lower from the LPN than from the at least one neighboring node.

14 Claims, 3 Drawing Sheets

(51) Int. Cl.
*H04W 72/12* (2009.01)
*H04W 84/04* (2009.01)

(56) References Cited

U.S. PATENT DOCUMENTS

| | | | |
|---|---|---|---|
| 2003/0027529 A1* | 2/2003 | Haugli | H03M 7/40 455/67.11 |
| 2003/0195017 A1* | 10/2003 | Chen | H01Q 1/246 455/562.1 |
| 2004/0014482 A1* | 1/2004 | Kwak | H04W 56/00 455/522 |
| 2004/0092256 A1* | 5/2004 | Keller | H04W 16/02 455/422.1 |
| 2004/0131029 A1* | 7/2004 | Tobe | H04M 15/8016 370/331 |
| 2004/0235510 A1* | 11/2004 | Elicegui | H04W 52/40 455/522 |
| 2004/0264501 A1* | 12/2004 | Zalitzky | H04B 3/544 370/468 |
| 2005/0020213 A1* | 1/2005 | Azman | H04L 1/0002 455/67.11 |
| 2005/0048976 A1* | 3/2005 | Kalhan | H04W 36/32 455/440 |
| 2005/0176419 A1* | 8/2005 | Triolo | H04W 52/343 455/423 |
| 2006/0182067 A1 | 8/2006 | Rinne et al. | |
| 2006/0205412 A1* | 9/2006 | Oh | H04W 16/02 455/450 |
| 2007/0077929 A1* | 4/2007 | Chen | H04W 16/06 455/445 |
| 2007/0116049 A1* | 5/2007 | Johnson | G06F 1/3203 370/468 |
| 2007/0184869 A1* | 8/2007 | Koo | H04B 7/15535 455/522 |
| 2008/0039129 A1* | 2/2008 | Li | H04L 1/0003 455/522 |
| 2008/0101307 A1* | 5/2008 | Sindhushayana | H04W 52/346 370/337 |
| 2009/0052322 A1* | 2/2009 | Simonsson | H04W 28/20 370/235 |
| 2009/0067366 A1* | 3/2009 | Aust | H04W 76/023 370/328 |
| 2009/0141667 A1* | 6/2009 | Jin | H04B 7/2606 370/315 |
| 2009/0181695 A1* | 7/2009 | Wirola | G01S 5/0252 455/456.1 |
| 2009/0325625 A1* | 12/2009 | Hugl | H04W 52/16 455/522 |
| 2010/0080195 A1* | 4/2010 | Hara | H04W 4/20 370/336 |
| 2010/0080323 A1* | 4/2010 | Mueck | H04J 11/0033 375/296 |
| 2010/0128624 A1* | 5/2010 | Lee | H04L 41/06 370/252 |
| 2010/0150084 A1* | 6/2010 | Joko | H04W 72/042 370/329 |
| 2010/0177721 A1* | 7/2010 | Simonsson | H04J 11/005 370/329 |
| 2010/0304665 A1* | 12/2010 | Higuchi | H04B 7/15535 455/7 |
| 2011/0176497 A1* | 7/2011 | Gopalakrishnan | H04J 11/0053 370/329 |
| 2011/0255486 A1* | 10/2011 | Luo | H04W 48/12 370/329 |
| 2012/0099455 A1 | 4/2012 | Morita et al. | |
| 2012/0231806 A1* | 9/2012 | Maric | H04W 28/22 455/452.2 |
| 2012/0238313 A1* | 9/2012 | Zhou | H04W 52/343 455/522 |
| 2013/0023217 A1* | 1/2013 | Zhuang | H04W 24/02 455/63.1 |
| 2013/0023276 A1* | 1/2013 | Du | H04B 7/024 455/452.1 |
| 2013/0077599 A1* | 3/2013 | Dimou | H04W 36/22 370/331 |
| 2013/0172001 A1* | 7/2013 | Gerlach | H04W 16/32 455/450 |
| 2013/0182665 A1* | 7/2013 | Venkatraman | H04B 7/0452 370/329 |
| 2013/0210409 A1* | 8/2013 | Grayson | H04W 24/02 455/418 |
| 2013/0225183 A1* | 8/2013 | Meshkati | H04W 52/18 455/448 |
| 2013/0244666 A1* | 9/2013 | Carmon | H04W 52/0261 455/438 |
| 2013/0310040 A1* | 11/2013 | Kwun | H04W 52/0235 455/436 |
| 2013/0336151 A1* | 12/2013 | Saitou | H04W 52/244 370/252 |
| 2014/0011534 A1* | 1/2014 | Dimou | H04W 16/08 455/522 |
| 2014/0248886 A1* | 9/2014 | Yamazaki | H04W 52/244 455/443 |

\* cited by examiner

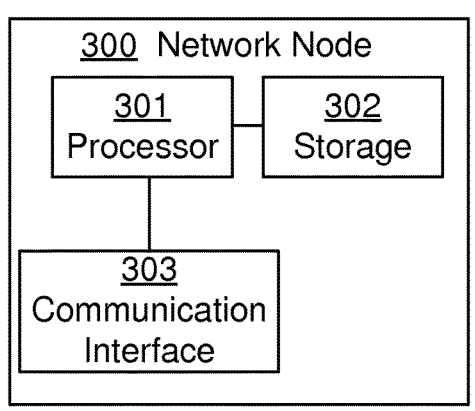
Fig. 3
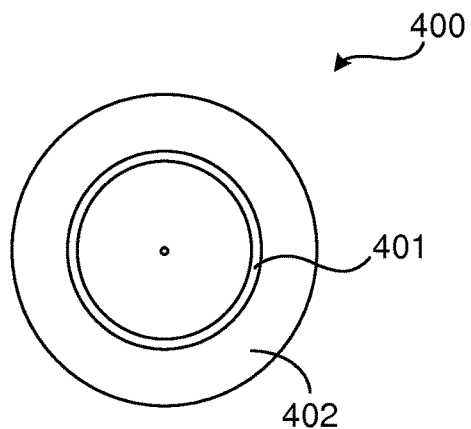
Fig. 4
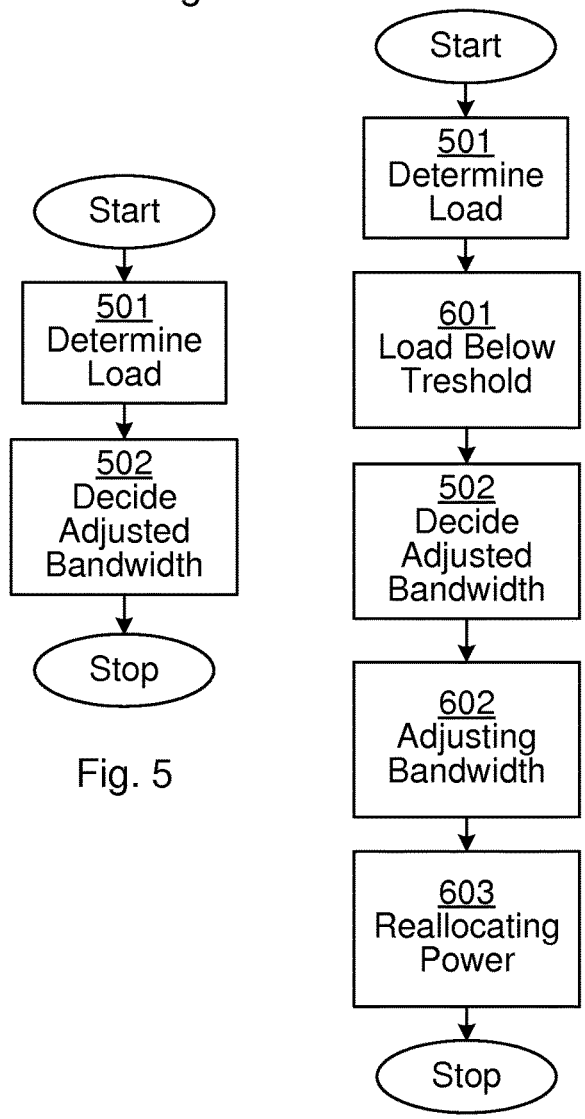
Fig. 5
Fig. 6

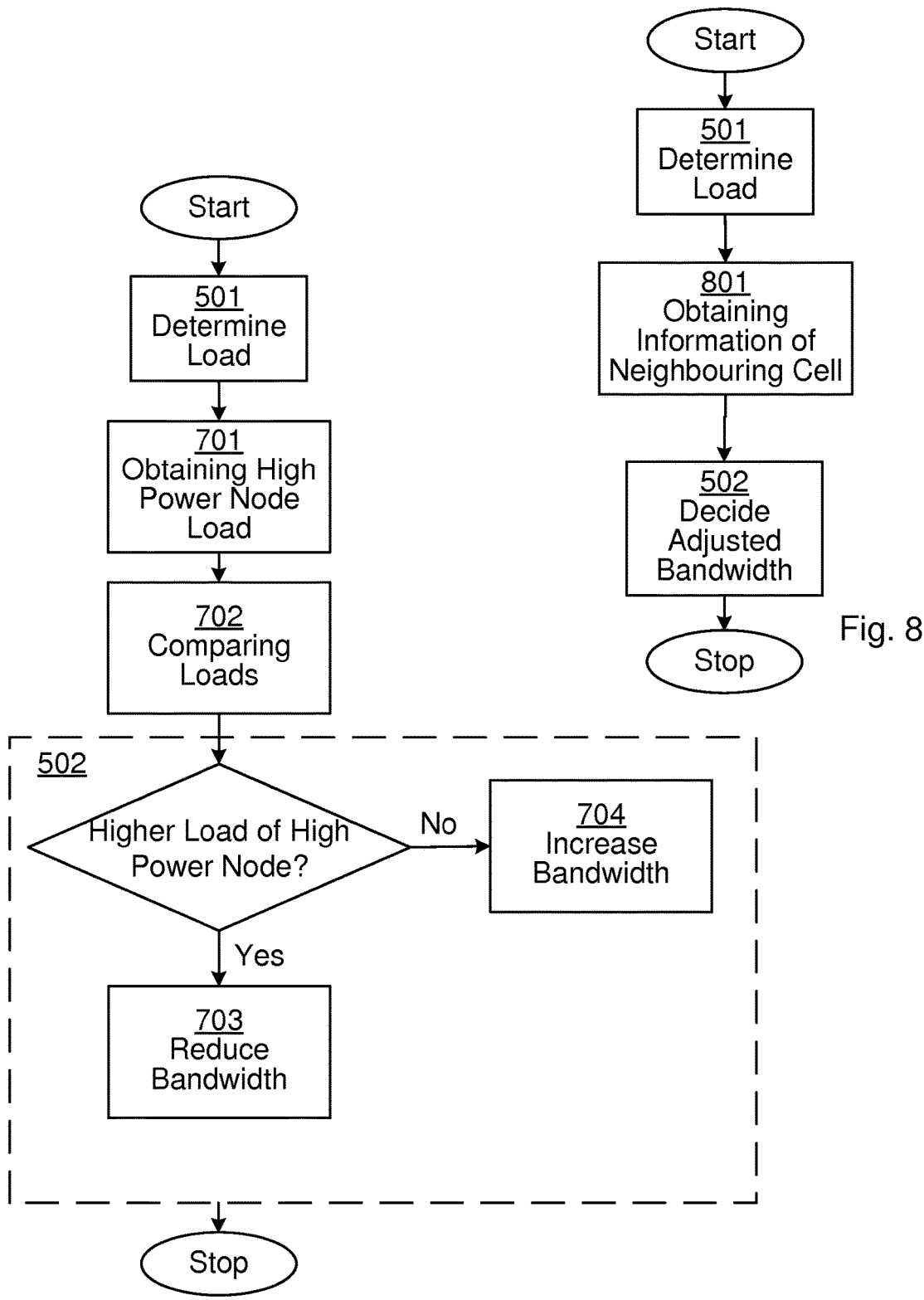

METHOD AND NETWORK NODE FOR IMPROVING RESOURCE UTILIZATION OF A RADIO CELL

CROSS REFERENCE TO RELATED APPLICATION(S)

This application is a 35 U.S.C. §371 National Phase Entry Application from PCT/EP2012/068535, filed Sep. 20, 2012, the disclosure of which is incorporated by reference.

TECHNICAL FIELD

The invention relates to a method and a network node for improving utilization of resources of a cell provided by a radio base station, the cell covering a geographical area and being a cell served by a low power node of the radio base station in a heterogeneous network.

BACKGROUND

Heterogeneous networks comprise nodes of different transmit powers. Low power nodes (LPNs) do often have a smaller coverage area than macro nodes due to different power limitations. The coverage area of a cell can be defined as the area in which the node of the cell is best "heard" by a user equipment (UE) compared with neighbouring nodes, i.e. the cell provides the strongest downlink (DL) signal. LPNs are deployed for coverage in places where there is a particularly high load on the network (hot spots) or where the macro nodes have reduced coverage. LPNs can for instance be deployed indoors, covering a level/floor of a building or such. The deployment of an LPN within the coverage area of macro nodes results in transition zones where either downlink or uplink transmission may be sub-optimally transmitted. This is because within this transition zone, the path loss of a user equipment (UE) to the LPN is lower than the path loss to a macro node, e.g. because the UE is closer to the LPN than to the macro node. However, due to the reduced power of the LPN, the downlink (DL) power received by the UE in the transition zone is higher from the macro node than from the LPN.

The load on an LPN, e.g. at a hot spot, can vary much over time, why much of the capacity of the LPN may be unused. Cell range expansion can be used to expand the serving area of an LPN beyond its regular coverage area mentioned above, whereby the LPN can serve a UE even where the received DL power density is higher from the macro node than from the LPN. Power density is the power per frequency (power/Hz). However, the DL then experiences much interference from the macro node and the downlink received signal to interference and noise ration (SINR) at UEs associated to the LPN may be very low. Almost blank subframes (ABS) of the macro node can be used for reducing the DL interference, however then the utilization of the macro node resources is reduced.

SUMMARY

It is an objective of the present disclosure to improve the utilization of resources of an LPN in a heterogeneous telecommunication network.

According to an aspect of the present disclosure, there is provided a method of a network node for improving utilization of resources of a cell provided by a radio base station, RBS, the cell covering a geographical area and being a cell served by a low power node of the RBS in a heterogeneous network. The method comprises determining a load of downlink (DL) resources of the cell used for wireless communication terminal(s) connected to the cell. The method also comprises deciding, based on said determined load, that the DL bandwidth available for scheduling of the cell should be adjusted, allowing the power of the low power node to be reallocated for the adjusted bandwidth available for scheduling whereby a transition zone area between the low power node and at least one neighbouring node will be adjusted accordingly. The transition zone is an area in which a path-loss is lower to the low power node than to the at least one neighbouring node but a received DL power density is lower from the low power node than from the at least one neighbouring node.

According to another aspect of the present disclosure, there is provided a network node. The network node comprises a processor, and a storage unit storing instructions that, when executed by the processor, cause the network node to determine a load of downlink (DL) resources of a cell served by a low power node and covering a geographical area in a heterogeneous radio network, which resources are used for wireless communication terminal(s) connected to the cell. The instructions also cause the node to decide, based on said determined load, that the DL bandwidth of the cell available for scheduling should be adjusted, allowing the power of the low power node to be reallocated for the adjusted bandwidth available for scheduling whereby a transition zone area between the low power node and at least one neighbouring node will be adjusted accordingly. The transition zone is an area in which a path-loss is lower to the low power node than to the at least one neighbouring node but a received DL power density is lower from the low power node than from the at least one neighbouring node.

According to another aspect of the present disclosure, there is provided a computer program product comprising computer-executable components for causing a network node to perform an embodiment of a method of the present disclosure when the computer-executable components are run on a processor comprised in the network node.

According to another aspect of the present disclosure, there is provided a computer program for improving utilization of resources of a cell provided by a radio base station (RBS), the cell covering a geographical area and being served by a low power node (LPN) of the RBS in a heterogeneous network. The computer program comprises computer program code which is able to, when run on a processor of a network node, cause the network node to determine a load of downlink (DL) resources of the cell used for wireless communication terminal(s) connected to the cell. The code is also able to cause the node to decide, based on said determined load, that the DL bandwidth of the cell available for scheduling should be adjusted, allowing the power of the low power node to be reallocated for the adjusted bandwidth available for scheduling whereby a transition zone area between the low power node and at least one neighbouring node will be adjusted accordingly. The transition zone is an area in which a path-loss is lower to the low power node than to the at least one neighbouring node but a received DL power density is lower from the low power node than from the at least one neighbouring node.

According to another aspect of the present disclosure, there is provided a computer program product comprising an embodiment of a computer program of the present disclosure and a computer readable means on which the computer program is stored.

It is an advantage to, based on the load of DL resources of an LPN cell, adjust the DL bandwidth of the cell available for scheduling. By adjusting the bandwidth, the limited power of the LPN can be reallocated to the adjusted bandwidth, whereby the DL range of the LPN is changed accordingly. For example, if the load of the cell is low, the bandwidth can be reduced, whereby the transmission power of the LPN is reallocated to the adjusted, more narrow, bandwidth. Since the limited power is then allocated to a narrower bandwidth, the power density within said bandwidth is increased, increasing the range of the LPN. An increased range cell can then reach and serve more terminals, taking load off any neighbouring cells (e.g. macro cells). Further, the transition zone is reduced, reducing problems associated with terminals which based on UL quality would like to be connected to the LPN but which based on DL quality would like to be connected to the neighbouring node. Similarly, if the cell load is high, the bandwidth may be increased to accommodate the high load, and at the same time reducing the DL range of the cell. Adjusting bandwidth available for scheduling may be an alternative to or complement range expansion, and it may reduce the need for ABS.

In some embodiments, it is determined that the determined load is below a threshold value. Then the deciding that the bandwidth should be adjusted can comprise deciding that the bandwidth available for scheduling should be reduced since the load is below the threshold value. To use a threshold value is a simple way of determining whether the load is low enough to motivate a bandwidth reduction. In some embodiments, another threshold value can be used to determine whether the load is high enough to motivate an increase of the bandwidth.

In some embodiments, information is obtained regarding a load of DL resources of a cell served by a high power node (HPN) used for wireless communication terminal(s) connected to said cell served by an HPN, the cell being served by an HPN having a higher power than the LPN of the RBS and covering a geographical area which at least partly overlaps the area covered by the cell served by the LPN, the HPN being one of the at least one neighbouring node. Then the deciding that the bandwidth should be adjusted is additionally based on said obtained information regarding the load of DL resources of a cell served by the HPN. This allows the respective loads of the LPN and the HPN to be balanced with regard to each other. For example, if the load of the LPN is low and the load of the HPN is high, the bandwidth of the LPN may be reduced on order to extend its range and take some load off the HPN. Thus, in some embodiments, the determined load of the cell served by the LPN is compared with the load of the cell served by the HPN, and the deciding that the bandwidth should be adjusted is based on said comparison. In some embodiments, the deciding that the bandwidth should be adjusted comprises deciding that the bandwidth available for scheduling should be reduced if the relative load of the cell served by the HPN is higher than the relative load of the cell served by the LPN, the relative load being defined as the load relative to the bandwidth available for scheduling e.g. a percentage which is used of the available bandwidth. Similarly, in some embodiments, the deciding that the bandwidth should be adjusted comprises deciding that the bandwidth available for scheduling should be increased if the relative load of the cell served by the LPN is higher than the relative load of the cell served by the HPN.

The network node may be any node, e.g. a node of the core network (CN), a radio network control (RNC) node, or a node of the RBS. The RBS may comprise a plurality of nodes, including the LPN, e.g. remote radio units (RRU) each serving a cell, or the RBS may serve only one cell. Thus, in some embodiments, the network node is comprised in the RBS. It may be advantageous to allow the RBS to adjust its bandwidth without having to rely on instructions from higher up in the network. Then, in some embodiments, the DL bandwidth available for scheduling, of the cell served by the LPN, is adjusted in accordance with the deciding that the bandwidth should be adjusted, and the power of the LPN is reallocated for the adjusted bandwidth available for scheduling. In some embodiments, e.g. if the network is in accordance with a long term evolution (LTE) communication standard, the reallocating comprises reallocating power between resource blocks of the adjusted bandwidth available for scheduling. In some embodiments, the reallocating comprises reallocating all available power to scheduled resource blocks. To allocate all the DL power of the LPN to the scheduled blocks, optimises the range of the LPN cell and the DL SINR for the scheduled blocks, and reduces the area of the transition zone.

In some embodiments, information of the neighbouring cell regarding DL bandwidth available for scheduling and/or frequencies used by said neighbouring cell is obtained. Then, the deciding that the bandwidth should be adjusted comprises deciding which frequencies should be used by the cell served by the LPN for the adjusted bandwidth available for scheduling of said cell served by the LPN. Thus, if the LPN cell is not using the whole bandwidth, it can choose to use any frequencies not used by the neighbouring cell in order to reduce the risk of interference between the two cells.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawings, in which:

FIG. 3 is a schematic block diagram of an embodiment of a network node of the present disclosure.

FIG. 4 is a schematic illustration of an embodiment of a computer program product of the present disclosure.

FIG. 5 is a schematic flow chart of an embodiment of a method of the present disclosure.

FIG. 6 is a schematic flow chart of another embodiment of a method of the present disclosure.

FIG. 7 is a schematic flow chart of another embodiment of a method of the present disclosure.

FIG. 8 is a schematic flow chart of another embodiment of a method of the present disclosure.

DETAILED DESCRIPTION

Figure 1:
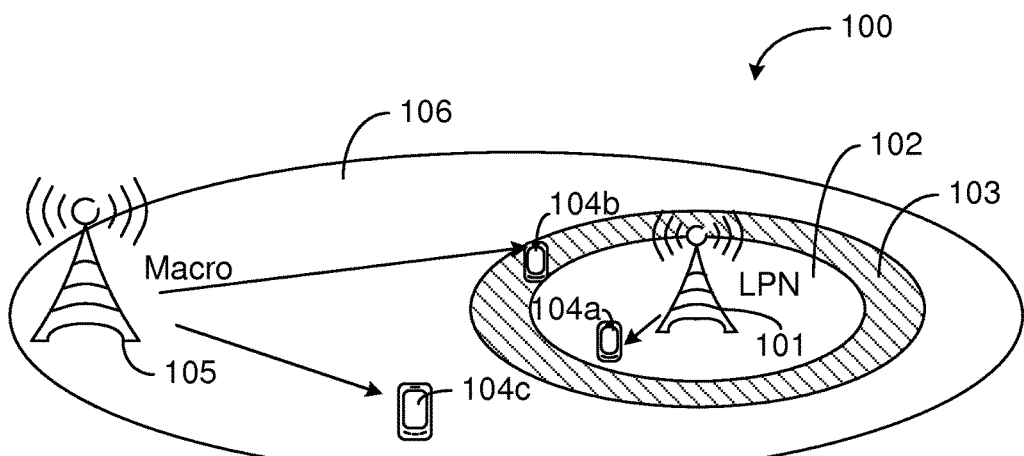
FIG. 1 is a schematic illustration of an embodiment of a heterogeneous network of the present disclosure.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The heterogeneous network, and thus the network node, the LPN and the RBS, is a cellular communication network and may be in accordance with any suitable communication standard allowing the deployment of a heterogeneous network, e.g. LTE or multiband Wideband Code Division Multiple Access (WCDMA), preferably LTE which supports heterogeneous networks. Further, the network may be configured for time division duplex (TDD) and/or frequency division duplex (FDD).

The LPN may be any type of node able to serve a cell in a heterogeneous network where nodes of a higher power (e.g. macro nodes) are also deployed. The LPN may e.g. serve any of a micro, pico, femto or nano cell or a Home Node B, a relay or a repeater. The LPN may e.g. be a Node B or an evolved Node B (eNB). In some embodiments, the network node is comprised in the RBS, e.g. in the LPN.

The coverage area of a cell can be defined as the area in which the node of the cell is best "heard" by a wireless communication terminal compared with neighbouring nodes, i.e. the cell provides the strongest downlink (DL) signal.

Herein, a reference to a property of a cell may be interchangeable with a reference to a property of the node serving that cell. Thus, e.g. when the load of a cell is discussed, this is the same load as when the load of the node serving that cell is discussed.

The wireless communication terminal may be any device, mobile or stationary, enabled to communicate over a radio cannel in the communications network, for instance but not limited to e.g. mobile phone, smart phone, user equipment (UE), sensors, meters, vehicles, household appliances, medical appliances, media players, cameras, or any type of consumer electronic, for instance but not limited to television, radio, lighting arrangements, tablet computer, laptop, or PC.

The load of downlink resources of a cell can be measured in different ways, e.g. in terms of number of users/terminals connected to the cell, resource utilization e.g. average allocated fraction of the bandwidth (i.e. a relative load if the bandwidth is the bandwidth available for scheduling), and/or amount of data/information transmitted in DL per unit of time e.g. bits per second (this is an absolute measure, which can be expressed as a relative load if divided with the bandwidth available for scheduling).

The time scale for which the load is measured can be from weeks down to milliseconds (ms). When measured for weeks or days the coverage of the LPN may be adapted to average traffic situation. The load may also or alternatively be measured during a busy hour each day to adapt to the high load situation. The load may also or alternatively be measured every hour, adapting the coverage of the LPN to the load variation and spatial distribution movement during different times of the day. The load variation may also or alternatively be captured for shorter time scales down to each scheduling interval (e.g. each ms).

That a terminal is connected to a cell means that the terminal is served by the node providing/serving the cell.

FIG. 1 schematically illustrates an embodiment of a heterogeneous network 100. A low power node (LPN) of an RBS 101 serves a cell 102 of the cellular network 100. It is noted that the RBS 101 can comprise one or more radio nodes, including the LPN serving the cell 102. However, herein the RBS is exemplified as only comprising the LPN, the reference numeral 101 being used to denote both the LPN and the RBS. A high power node (HPN) comprised in a macro RBS 105 neighbours the RBS 101 and serves a macro cell 106 which encloses the LPN cell 102. The LPN serves one wireless terminal 104a, while the macro node 105 serves two wireless terminals 104b and 104c. Between the macro node 105 and the LPN there can e.g. be 10-20 dB power difference. There are a number of different nodes that are deployed with different downlink power levels, e.g. micro, pico, relays and repeaters. Due to the different power levels, the coverage areas or cells 106 of macro nodes 105 are much larger than the coverage areas/cells 102 of LPNs. In the case where an LPN is placed in a hotspot where the wireless terminal density is high, this may not be a problem. However, when LPNs 101 are deployed e.g. indoors, a relatively large number of LPNs are needed to get coverage, even though the number of users is not large. For example, in office buildings the floors often have high isolation and pico nodes must be deployed on each floor which may lead to low load per pico node. If the number of users served by a LPN 101 is low compared to the number of users served by the macro node 105 covering the surrounding area 106, the load might be unbalanced between the macro node and the pico nodes, and the resources of an LPN may not be efficiently used.

Figure 2:
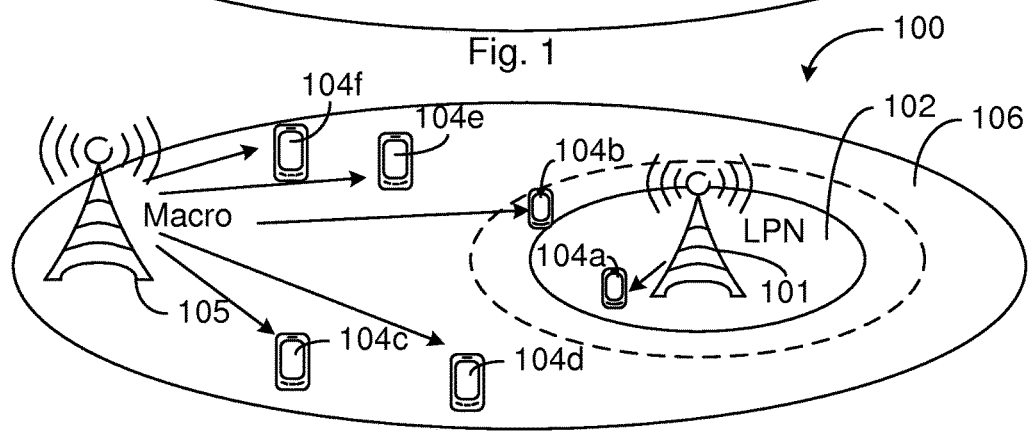
FIG. 2 is a schematic illustration of another embodiment of a heterogeneous network of the present disclosure.

FIG. 2 schematically illustrates another embodiment of a heterogeneous network 100. In this embodiment, as in FIG. 1, the terminal 104a is connected to the LPN cell 102, while the terminals 104b, 104c, 104d, 104e and 104f are connected to the macro cell 106 served by the macro node 105. The solid line delimiting the LPN cell 102 marks the range of the cell based on received DL power density, i.e. a terminal 104 outside of the cell line will receive a higher DL power density from the macro node 105 than from the LPN 101. However, by reducing the bandwidth available for scheduling of the LPN as discussed herein, the range of the LPN on the remaining frequencies of the adjusted reduced bandwidth is increased to the dashed line around the LPN 101 in FIG. 2. Thus, the wireless terminal 104b will be able to be connected to the LPN cell 102 since the interfering signals from the macro node 105 will be weaker than the signals from the serving LPN 101. In this way, the macro node 105 can be offloaded by the LPN 101, since the terminal 104b is connected to the LPN 101 instead of the macro node 105 without needing ABS.

FIG. 3 is a schematic illustration of an embodiment of a network node 300 of the present disclosure. As mentioned above, the network node may e.g. be part of the core network or the radio access network (RAN) such as be comprised in the RBS or LPN 101. The network node 300 comprises a processor 301 e.g. a central processing unit (CPU). The processor 301 may comprise one or a plurality of processing units in the form of microprocessor(s). However, other suitable devices with computing capabilities could be comprised in the processor 301, e.g. an application specific integrated circuit (ASIC), a field programmable gate array (FPGA) or a complex programmable logic device (CPLD). The processor 301 is configured to run one or several computer program(s) or software stored in a storage unit 302 e.g. a memory. The storage unit is regarded as a computer readable means and may e.g. be in the form of a Random Access Memory (RAM), a Flash memory or other solid state memory, or a hard disk. The processor 301 is also configured to store data in the storage unit 302, as needed. The network node 300 also comprises a communication interface 303. The communication interface is configured for communication with the network 100. If the network node is located in the RBS/LPN 101, the communication interface 303 is used to enable communication with the core network (CN) and/or the terminals 104 served by the LPN. If the communication interface 303 is located in the CN, e.g. in a core network node, it may be used to communicate information affecting the bandwidth selection in the LPN 101.

FIG. 4 illustrates a computer program product 400. The computer program product 400 comprises a computer readable medium 402 comprising a computer program in the form of computer-executable components 401. The computer program/computer-executable components 401 may be configured to cause a network node 300, e.g. as discussed above, for improving utilization of resources of an LPN cell to perform an embodiment of the method of the present invention. The computer program/computer-executable components may be run on the processing unit 301 of the network node 300 for causing the network node to perform the method. The computer program product 400 may e.g. be comprised in a storage unit or memory 302 comprised in the network node 300 and associated with the processing unit 301. Alternatively, the computer program product 400 may be, or be part of, a separate, e.g. mobile, storage means, such as a computer readable disc, e.g. CD or DVD or hard disc/drive, or a solid state storage medium, e.g. a RAM or Flash memory.

FIG. 5 is a flow chart illustrating an embodiment of a method of the present disclosure. A load of DL resources of the LPN cell used for wireless communication terminals 104 connected to the cell is determined 501. As discussed above, the load can be measured in many different ways and can be an indication of the amount of bandwidth available for scheduling the connected terminals 104, which the LPN 101 needs or should be prepared with. Based on the determined 501 load, it is decided 502 that the DL bandwidth of the cell 102 available for scheduling should be adjusted, allowing the power of the LPN 101 to be reallocated for the adjusted bandwidth available for scheduling whereby a transition zone area between the low power node and at least one neighbouring node will be adjusted accordingly. As previously discussed herein, a reduced bandwidth allows the range or coverage of the LPN 101 to be increased since the power of the LPN can be reallocated to fewer frequencies, and an increased bandwidth allows the range or coverage of the LPN 101 to be reduced since the power of the LPN can be reallocated to more frequencies (a wider frequency spectrum).

The adjusted bandwidth may only be applied to the data transmission, such as the Physical Downlink Shared CHannel (PDSCH) in LTE. Control information, such as Reference Symbols (RS) and Physical Downlink Control Channel (PDCCH) in LTE, may still be transmitted on the full bandwidth. The power can be reallocated from the unused data transmission symbols to all the remaining transmitted symbols. For LTE this leads to that the RS power is increased and the handover border between the LPN and the HPN naturally is move to the desired extended range (dashed line in FIG. 2). The power reallocation can also be done to only a selected set of the channels that is considered needing the higher power.

FIG. 6 is a flow chart illustrating other embodiments of a method of the present disclosure. After having determined 501 the load of DL resources, as discussed in respect of FIG. 5, it is determined 601 whether the determined 501 load is above or below a threshold value. If the load is below the threshold value, it is decided 502 that the bandwidth should be adjusted to a reduced bandwidth. Additionally or alternatively, if the load is above the threshold value, it is decided 502 that the bandwidth should be adjusted to an increased bandwidth. In some embodiments, an upper threshold and a lower threshold is used, where a load above the upper threshold results in deciding 502 to increase the bandwidth and a load below the lower threshold results in deciding 502 to reduce said bandwidth. It should be noted that by adapting to absolute load there could be multiple thresholds, each relating to a specific bandwidth available for scheduling. Further, if the method is performed in the RBS or LPN 101, the DL bandwidth available for scheduling, of the cell 102 served by the LPN 101, is adjusted 602 in accordance with the deciding 502. Also, the power of the LPN is reallocated 603 for the adjusted 602 bandwidth available for scheduling.

FIG. 7 is a flow chart illustrating other embodiments of a method of the present disclosure. Information regarding a load of DL resources of a cell 106 served by a neighbouring HPN 105 is obtained 701. The load of the HPN may be measured in the same units as the load of the LPN, making the loads comparable to each other. The load information of the HPN may be obtained 701 before, during or after the LPN load is determined 501, as discussed in respect of FIG. 5. The deciding 502 is then based also on the obtained 701 HPN load information. In some embodiments, the determined 501 load of the cell 102 served by the LPN 101 is compared 702 with the load of the cell 106 served by the HPN 105. Then, the deciding 502 can be based on the comparison 702 between the load of the cell 102 served by the low power node and the load of the cell 106 served by the high power node. In some embodiments, the deciding 502 comprises deciding that the bandwidth available for scheduling should be reduced 703 if the relative load of the cell 106 served by the HPN 105 is higher than the relative load of the cell 102 served by the LPN 101; or the deciding 502 comprises deciding that the bandwidth available for scheduling should be increased 704 if the relative load of the cell 102 served by the LPN 101 is higher than the relative load of the cell 106 served by the HPN 105.

FIG. 8 is a flow chart illustrating other embodiments of a method of the present disclosure. Information of one or more neighbouring cell(s), possibly the cell 106 between which the LPN cell 102 forms the transition zone 103, is obtained 801. Additionally or alternatively, the neighbouring cell(s) are other LPNs which operate relatively close to each other, increasing the risk of interference there between. The obtained 801 information is regarding DL bandwidth available for scheduling and/or frequencies used by said one or more neighbouring cell(s). Then, the deciding 502 also comprises deciding which frequencies should be used by the cell 102 served by the low power node for the adjusted bandwidth available for scheduling of said cell 102 served by the LPN 101.

Example 1

By only scheduling downlink transmission from an LPN 101 to the associated UEs 104 on parts of the available bandwidth, the signal power spectral density (i.e. the power density) can be increased. This reduces the size of the transition zone 103 and yields an increased downlink received SINR at the UEs. The bandwidth reduction can be balanced to reach the same relative load in the LPN 101 as in the macro node 105.

Example 2

The scheduled bandwidth for LPNs 101 is adjusted dynamically (fast or slow) to achieve a good trade-off between LPN coverage area (range) and capacity. If the load of the LPN 101 is high, the full bandwidth should be used, while only parts of the bandwidth are used if the load is low. The reduced bandwidth enables increased power spectrum density in downlink transmission by utilizing the full power capability in the LPN 101. Only downlink bandwidth is reduced, utilizing the full bandwidth in uplink which is not limited by the power of the LPN 101.

As already seen in FIG. 2, with standard scheduling, the coverage of the LPN 101 (defined as the area where the LPN provides the strongest DL signals) is limited by the solid line close to the LPN. Using bandwidth reduction, the coverage can be extended to the dashed line reducing the transition zone 103, which is useful if the load of the LPN 101 is lower than the load of the macro node 105 serving the surrounding cell 106 area. By balancing the relative loads of the LPN 101 and the HPN 105, the LPN resources can be more efficiently utilized. In the example of FIG. 2, the macro node 105 serves four UEs 104 (instead of five) while the LPN 101 serves two UEs 104 (instead of only one) using the proposed load balancing through bandwidth reduction.

Example 3

A good trade-off between capacity and coverage of the LPN 101 is achieved when the relative load on the adjusted bandwidth available for scheduling of the LPN is about the same as the relative load of the macro node 105. This can be balanced e.g. as packed data load [bps/Hz] or user load [#UE/Hz]. By reducing the bandwidth to increase the coverage of the cell 102, the relative load on the reduced bandwidth is increased due to two reasons. First of all, the increased coverage makes it possible for the LPN 101 to serve additional UEs 104. Secondly, reducing the bandwidth means that the relative load on the remaining frequencies of the reduced bandwidth is increased.

Figure 9:
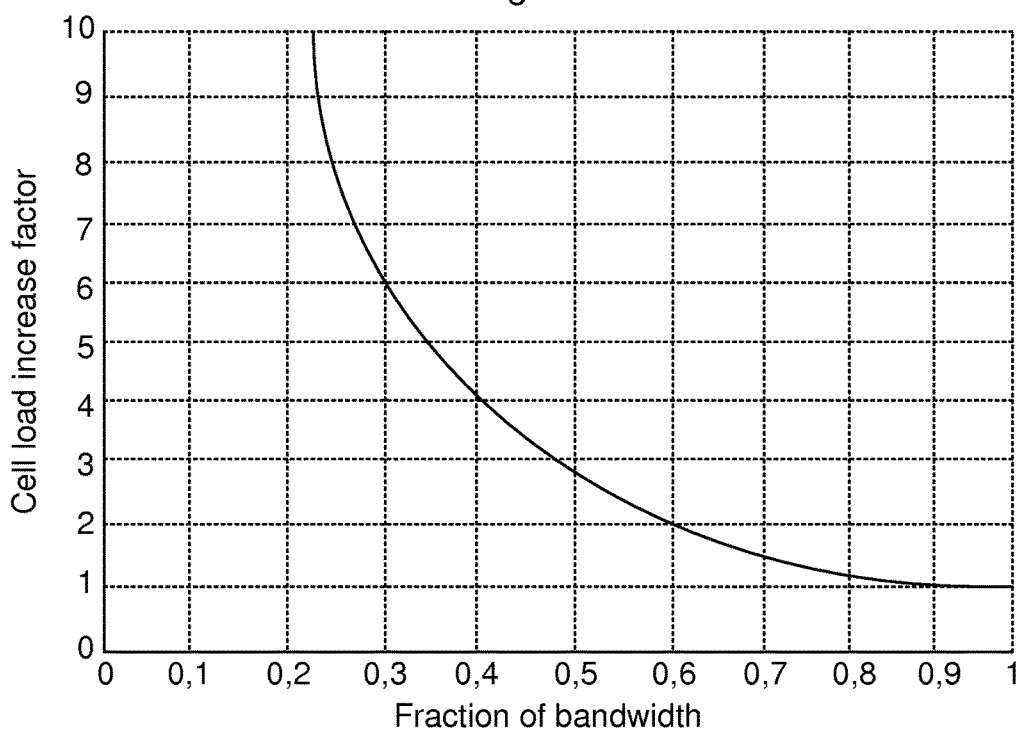
FIG. 9 is a graph illustrating a correlation between bandwidth and cell load.

FIG. 9 shows an example of how the cell 102 relative load of an LPN 101 is increased when the scheduled bandwidth is reduced. In this example, the propagation decaying factor is 4 and it is assumed that the UEs 104 are uniformly distributed within the macro cell 106 area. Furthermore, it is assumed that each UE 104 cause the same load on the network 100. When the full bandwidth is used, the relative cell load increase factor is one. If the scheduled bandwidth of the LPN 101 is reduced to half, the relative load of the LPN is increased almost by a factor of three under these assumptions.

Example 4

Consider again the example shown in FIG. 2. Assuming that each UE 104 causes 20% load to a cell 102 or 106 and respective nodes 101 and 105, the load of the LPN 101 is only 20% (one UE is served) while the macro node has full load (5 UEs are served), if the range of the LPN is not expanded. According to the cell load increase factor shown in FIG. 9, reducing the scheduled bandwidth of the LPN to 40% of the full bandwidth, increases the load of the LPN 101 with a factor of four (to 80%) for uniform UE distribution at the same time as the macro node 105 load is slightly reduced. The scheduled bandwidth of the LPN 101 may be reduced (and increased again) adaptively to keep the relative load of the macro node 105 in balance with the relative load on the reduced bandwidth of the LPN 101.

The proposed solution may be described sequentially as:
1. Check the relative load of each LPN 101 in the network 100
2. If the relative load of an LPN 101 is lower 601 than a threshold:
   a. Check 701 the relative load of the macro node 105 covering the surrounding area
   b. If the relative load of the macro node 105 is higher than the load of the LPN 101:
      i. Reduce 703 the bandwidth available for scheduling of the LPN 101 adaptively until the relative load on the bandwidth available for scheduling of the LPN is about the same as the relative load of the macro node 105.

Example 5

The proposed load balancing through reduced bandwidth may be combined with coordination of frequency reuse between neighbouring LPNs 101. Since the LPNs might not always schedule the full bandwidth, the intercell interference may be reduced by coordination of the subbands (frequencies) used by each LPN.

Example 6

In some embodiments, the method of the present disclosure can be combined with range expansion. For example, instead of ABS with extensive range expansion (increasing the range of the LPN 101 by >6 dB), the embodiments can reduce the transition zone 103 and be combined with a limited range expansion (<6 dB).

Example 7

For example, for indoor systems it may be desired to cover a certain area, such as a building or floor, with a low power pico node or other LPN 101. Embodiments of the present disclosure, possibly in combination with range expansion, will increase the feasible indoor pico coverage area. Furthermore, the coverage can be extended to minimize the transition zone 103 within the building. This leads to less traffic in the less efficient transition zone.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:
1. A method of a network node for improving utilization of resources of a cell provided by a radio base station, RBS, the cell covering a geographical area and being a cell served by a low power node of the RBS in a heterogeneous network, the method comprising:
   determining a load of downlink, DL, resources of the cell used for wireless communication terminal(s) connected to the cell; and deciding, based on said determined load, that the DL bandwidth of the cell available for scheduling should be adjusted, allowing the power of the low power node to be reallocated for the adjusted bandwidth available for scheduling whereby a transition zone area between the low power node and at least one neighbouring node will be adjusted accordingly, the transition zone being an area in which a path-loss is lower to the low power node than to the at least one neighbouring node but a received DL power density is lower from the low power node than from the at least one neighbouring node.

2. The method of claim 1, further comprising:
determining that the determined load is below a threshold value;
wherein the deciding comprises deciding that the bandwidth available for scheduling should be reduced since the load is below the threshold value.

3. The method of claim 1, further comprising:
obtaining information regarding a load of DL resources of a cell served by a high power node used for wireless communication terminal(s) connected to said cell served by a high power node, the cell being served by a high power node having a higher power than the low power node of the RBS and covering a geographical area which at least partly overlaps the area covered by the cell served by the low power node, the high power node being one of the at least one neighbouring node;
wherein the deciding is also based on said obtained information.

4. The method of claim 3, further comprising:
comparing the determined load of the cell served by the low power node with the load of the cell served by the high power node;
wherein the deciding is based on the comparison between the load of the cell served by the low power node and the load of the cell served by the high power node.

5. The method of claim 4, wherein
the deciding comprises deciding that the bandwidth available for scheduling should be reduced if the relative load of the cell served by the high power node is higher than the relative load of the cell served by the low power node; or
the deciding comprises deciding that the bandwidth available for scheduling should be increased if the relative load of the cell served by the low power node is higher than the relative load of the cell served by the high power node.

6. The method of claim 1, wherein the network node is comprised in the RBS.

7. The method of claim 6, further comprising:
adjusting the DL bandwidth available for scheduling, of the cell served by the low power node, in accordance with the deciding; and
reallocating the power of the low power node for the adjusted bandwidth available for scheduling.

8. The method of claim 7, wherein the reallocating comprises reallocating power between resource blocks of the adjusted bandwidth available for scheduling.

9. The method of claim 8, wherein the reallocating comprises reallocating all available power to scheduled resource blocks.

10. The method of claim 1, further comprising:
obtaining information of neighbouring cell regarding DL bandwidth available for scheduling and/or frequencies used by said neighbouring cell;
wherein the deciding comprises deciding which frequencies should be used by the cell served by the low power node for the adjusted bandwidth available for scheduling of said cell served by the low power node.

11. A computer program product comprising a non-transitory computer readable medium storing computer-executable components for causing a network node to perform the method of claim 1 when the computer-executable components are run on a processor comprised in the network node.

12. A network node comprising:
a processor; and
a storage unit storing instructions that, when executed by the processor, cause the network node to:
determine a load of downlink, DL, resources of a cell served by a low power node and covering a geographical area in a heterogeneous radio network, which resources are used for wireless communication terminal(s) connected to the cell; and
decide, based on said determined load, that the DL bandwidth of the cell available for scheduling should be adjusted, allowing the power of the low power node to be reallocated for the adjusted bandwidth available for scheduling whereby a transition zone area between the low power node and at least one neighbouring node will be adjusted accordingly, the transition zone being an area in which a path-loss is lower to the low power node than to the at least one neighbouring node but a received DL power density is lower from the low power node than from the at least one neighbouring node.

13. The network node of claim 12, wherein the network node is comprised in a radio base station comprising the low power node.

14. A computer program product comprising a non-transitory computer readable medium storing a computer program for improving utilization of resources of a cell provided by a radio base station, RBS, the cell covering a geographical area and being served by a low power node of the RBS in a heterogeneous network, the computer program comprising computer program code which is able to, when run on a processor of a network node, cause the network node to:
determine a load of downlink, DL, resources of the cell used for wireless communication terminal(s) connected to the cell; and
decide, based on said determined load, that the DL bandwidth of the cell available for scheduling should be adjusted, allowing the power of the low power node to be reallocated for the adjusted bandwidth available for scheduling whereby a transition zone area between the low power node and at least one neighbouring node will be adjusted accordingly, the transition zone being an area in which a path-loss is lower to the low power node than to the at least one neighbouring node but a received DL power density is lower from the low power node than from the at least one neighbouring node.

* * * * *